April 7, 1964  S. MEURER ETAL  3,127,880
MEANS FOR COOLING THE EXHAUST PORT WALL IN A POPPET
VALVE INTERNAL COMBUSTION ENGINE
Filed Aug. 29, 1963  2 Sheets-Sheet 1

INVENTORS
Siegfried Meurer
Klaus-Henning Barner

BY Bailey, Stephens and Huettig
ATTORNEYS

United States Patent Office 3,127,880
Patented Apr. 7, 1964

3,127,880
MEANS FOR COOLING THE EXHAUST PORT WALL IN A POPPET VALVE INTERNAL COMBUSTION ENGINE
Siegfried Meurer and Klaus Henning Barner, Nurnberg, Germany, assignors to Maschinenfabrik Augsburg-Nurnberg A.G., Nurnberg, Germany
Filed Aug. 29, 1963, Ser. No. 305,281
Claims priority, application Germany Sept. 7, 1962
6 Claims. (Cl. 123—41.85)

This invention relates to an arrangement for cooling the wall of the exhaust port for a poppet valve in an internal combustion engine.

Heretofore, the intake valve and the exhaust valve were separated by a web in the cylinder head with one or more air passageways through the web. Until now, these passageways have been used primarily for the cooling of the web by the intake air taken from the air intake duct and with the cooling directed to the narrow cross-section of the web which is directly heated by the engine commustion gases while being insufficiently cooled by the cooling circuit in the cylinder head because of the particular shape of the cylinder head. The web cooling air also was used for cooling the head of the exhaust valve by having the outlets of the air passageways directed toward the head of the exhaust valve. The mixing of the cooling air with the exhaust gases during the exhaust stroke was not considered aside from it being realized that such occurred. At present, such separate cooling of the head of the exhaust valve is not considered important inasmuch as the valve heads are now manufactured from sufficiently heat-resistant material. It is now believed to be more important to consider the fact that internal combustion engines are subject to high thermal loads with the result that the exhaust port in turn is highly heated so that the strains due to thermal stresses are apt to cause warping and possibly cracking which produces leaks in the valves and a resulting drop in the output of the engine.

The object of this invention is to produce an adequate air cooling of the wall for the exhaust gas valve port.

According to this invention, both the inlet and the outlet openings of the air passageways through the web are provided with air guide elements so that the guide element adjacent the intake air port extends into the flow of intake air and the guide element adjacent the exhaust port directs the air flowing from the passageways into the same direction as the gas exhausted through the exhaust valve. The air flowing through the web therefore has an additional function in producing a current of air over the wall of the exhaust port to prevent excessive heating of the wall. A plurality of air passageways usually extend through the web so that it is advantageous to have an air guide element common for each of the air inlet openings and the air outlet openings of the passageways, respectively. This further extends the width of the air current flowing over the wall of the exhaust port. A further feature of this invention obtains an optimum cooling of the exhaust port wall by forming the air guide element for the exhaust valve port as a ring mounted coaxially with the exhaust valve and having its inner wall shaped in the form of a venturi nozzle. This causes an even and unbroken air curtain over the wall of the exhaust port.

The means by which the objects of the invention are obtained are disclosed more fully with reference to the accompanying drawings in which.

Figure 1:
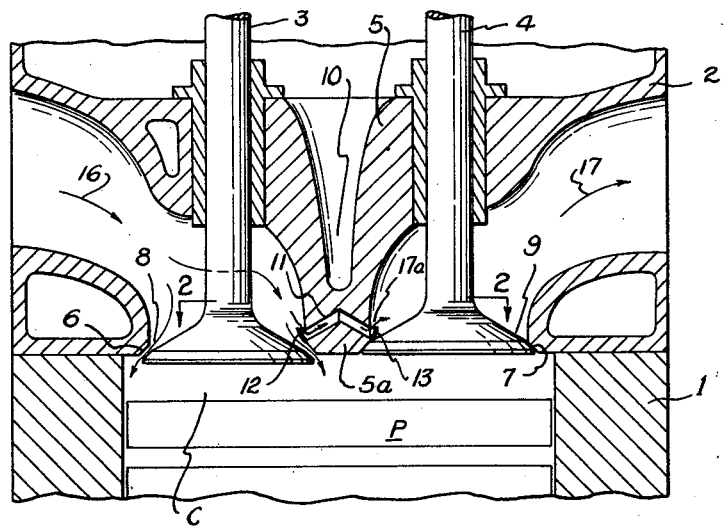
FIGURE 1 is a longitudinal cross-sectional view through the cylinder head and adjoining cylinder portion and showing the air passageways of this invention.
Figure 2:
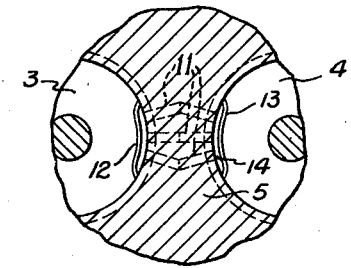
FIGURE 2 is a cross-sectional view taken on the line 2—2 of FIGURE 1.

As shown in FIGURE 1, the cylinder block 1 has a cylinder head 2 for a four-stroke fuel injection internal combustion engine. The cylinder head 2 has an air intake valve 3 and an exhaust gas valve 4, which valves are separated by a valve port web 5. Valve seats 6 and 7, respectively, must have large diameters in order to obtain the greatest possible volume of air flow for the piston cylinder C through the air intake port 8 and also for the rapid exhaust of the burned gases through the exhaust port 9. Accordingly, the construction cannot avoid a very narrow cross-sectional area 5a at the lower end of the web 5 and and where the end comes into direct contact with the hot combustion gases. It is not possible to extend the coolant space 10 in cylinder head 2 deep enough ino the web area 5a in order to provide sufficient cooling as this would unduly weaken the web. Therefore, air passageways 11 are formed through the end portion 5a of the web 5. Usually a plurality of passageways, such as three, are provided for making communication between the intake port 8 and the exhaust port 9. The inlet and outlet openings 12 and 13, respectively, of the air passageways are provided with air guide elements 12 and 13 composed of, for example, sheet material. These air guide elements are shaped so that the air inlet guide element 12 extends into the intake air flow indicated by the arrow 16 and acts as an air scoop. The exhaust port air guide element 13 extends in the direction of the flow of the gas through the exhaust port as indicated by the arrow 17. During the intake stroke of the piston P, when intake valve 3 is open, the majority of the intake air flows into the cylinder C while a small portion of the intake air, depending upon the cross-sectional area of the air passageways 11, is scooped out of the air stream by guide element 12 and directed into the passageways. Although an individual guide element can be used for each passageway, it is preferred to have a common guide element for all the passageways as shown in FIGURE 2.

At the outlet ends of the passageways 11, the common air guide element 13 directs the issuing air against the wall of the exhaust port in the form of a wide cooling air curtain. This cooling effect is increased due to the static negative pressure zone 17a which is formed at the outlet ends of passageways 11 because of the usual sudden opening of the exhaust valve 4 and the sudden flow of exhaust gases through exhaust port 9. This increases the amount of air flowing through the passageways. In addition, this means that the cooling air both flows on the wall of the exhaust port and partly mixes with the exhaust gases and lowers the temperature both during the aid intake stroke of the piston P and the following exhaust stroke. As the cross-sectional areas of air passageways 11 is always relatively small compared to the total cross-sectional area of the intake port 8, the amount of air flowing through the passageways during the intake stroke of piston P is so relatively little compared to the total amount of air drawn into the cylinder as to reduce the cylinder charge by only a negligible amount.

Figure 3:
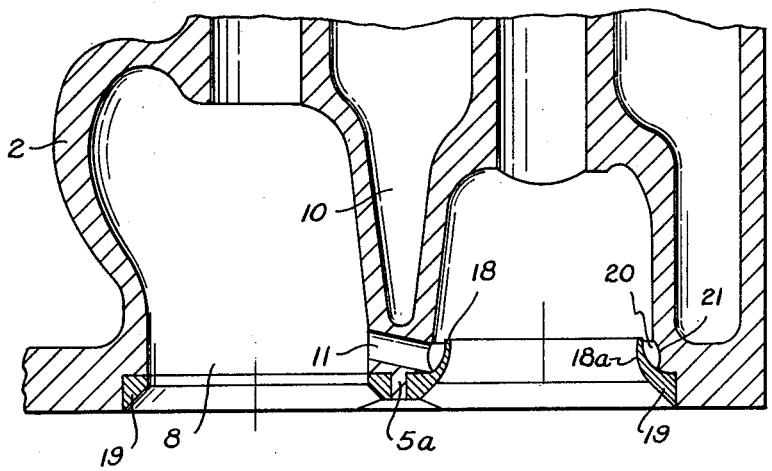
FIGURE 3 is a cross-sectional view through the cylinder head showing a modification of the invention.

In the modification of FIGURE 3, the exhaust port air guide element 18 is a ring mounted coaxially with the exhaust valve and, in addition, is integral with the exhaust valve seat 19. Furthermore, the inner wall of the ring 18 through which the exhaust gases flow is shaped as a venturi nozzle 18a so that the air curtain issuing from the annular space 20 into the exhaust port 9 is particularly intensively spread against the wall of this port. The air curtain thus acts to some extent as a heat shield for the wall and to some extent for providing a good heat exchange between the hot exhaust gases and the cooling air. If an increase in the amount of cooling air flow is desired, an annular groove 21 is formed in the wall of the exhaust port and in the plane of said ring.

Having now described the means by which the objects of the invention are obtained, we claim:

1. In an internal combustion engine having an intake poppet valve, an exhaust poppet valve, a valve port web between these valves, and at least one air passageway through said web for bringing cooling intake air into contact with the wall of the exhaust valve port, the improvement comprising a first guide element adjacent the intake opening into said passageway for scooping intake air into said passageway, and a second guide element adjacent the air outlet end of said passageway for discharging air from said passageway in the direction of the exhaust gas flow through the exhaust valve port.

2. In an engine as in claim 1, further comprising a plurality of air passageways through said web, and said first and second guide elements each being common to said passageways.

3. In an engine as in claim 1, said second guide element comprising a ring mounted coaxially with said exhaust poppet valve.

4. In an engine as in claim 3, said ring comprising a venturi nozzle for the passage of the exhaust gases from the engine.

5. In an engine as in claim 4, said ring being integral with the exhaust valve seat.

6. In an engine as in claim 5, further comprising an annular groove in the wall of said exhaust port and in the plane of said ring.

References Cited in the file of this patent
UNITED STATES PATENTS
2,816,530    Kloss ------------------ Dec. 17, 1957
FOREIGN PATENTS
548,101    Great Britain ----------- Sept. 24, 1942